United States Patent
Shao et al.

(10) Patent No.: US 12,231,218 B2
(45) Date of Patent: Feb. 18, 2025

(54) INTERFERENCE SUPPRESSION METHOD AND APPARATUS FOR AIR-TO-GROUND COMMUNICATIONS

(71) Applicants: China Mobile Communication Co., Ltd Research Institute, Beijing (CN); China Mobile Communications Group Co., Ltd., Beijing (CN)

(72) Inventors: Zhe Shao, Beijing (CN); Nan Li, Beijing (CN); Xiaoran Zhang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 274 days.

(21) Appl. No.: 18/005,238

(22) PCT Filed: Jul. 21, 2021

(86) PCT No.: PCT/CN2021/107623
§ 371 (c)(1),
(2) Date: Jan. 12, 2023

(87) PCT Pub. No.: WO2022/017416
PCT Pub. Date: Jan. 27, 2022

(65) Prior Publication Data
US 2023/0268983 A1 Aug. 24, 2023

(30) Foreign Application Priority Data

Jul. 24, 2020 (CN) .......................... 202010728129.X

(51) Int. Cl.
*H04B 7/185* (2006.01)

(52) U.S. Cl.
CPC ................................ *H04B 7/18502* (2013.01)

(58) Field of Classification Search
CPC ........ H04B 7/18502; H04B 1/10; H04B 1/12; H04B 1/40; H04B 7/185; H04B 7/18506;
(Continued)

(56) References Cited

U.S. PATENT DOCUMENTS

| 5,440,544 A * | 8/1995 | Zinser, Jr. | .......... H04B 7/18502 |
| | | | 370/321 |
| 9,385,803 B2 * | 7/2016 | Jalali | ................... H04B 7/18506 |

(Continued)

FOREIGN PATENT DOCUMENTS

| CN | 102938670 A | 2/2013 |
| CN | 103765795 A | 4/2014 |

(Continued)

OTHER PUBLICATIONS

Yang Wen, Chen Liqiang, Design and performance analysis of an adaptive anti-interference system for civil aviation froung-to-air communication[J], Telecommunication Engineering, 2019, 59 (12):1385-1390, Dec. 2019.

*Primary Examiner* — Phuongchau Ba Nguyen
(74) *Attorney, Agent, or Firm* — Price Heneveld LLP

(57) ABSTRACT

An interference suppression method and an interference suppression apparatus for air-to-ground (ATG) communications are provided. The method includes: determining first information, wherein the first information is used for one or more of the following: adjusting a maximum transmit power level of an ATG terminal; adjusting an output power value of the ATG terminal; adjusting an antenna gain of the ATG terminal; adjusting an antenna direction of the ATG terminal; determining a type of a terminal that is allowed to access an ATG base station.

14 Claims, 8 Drawing Sheets

(58) Field of Classification Search
CPC ............ H04B 7/18582; H04B 7/18508; H04B 7/18584; H04B 7/2041; H04H 40/90
See application file for complete search history.

(56) References Cited

U.S. PATENT DOCUMENTS

| | | | | |
|---|---|---|---|---|
| 9,398,573 | B2* | 7/2016 | Papasakellariou | H04W 72/04 |
| 9,473,958 | B2* | 10/2016 | Wang | H04W 24/02 |
| 9,491,635 | B2* | 11/2016 | Hyslop | H04W 24/02 |
| 9,882,630 | B2* | 1/2018 | Jalali | H04W 36/304 |
| 10,009,843 | B2* | 6/2018 | Chai | H04W 24/02 |
| 10,090,909 | B2* | 10/2018 | Peitzer | H04B 17/12 |
| 11,722,209 | B2* | 8/2023 | Ökvist | H04W 36/328 375/262 |
| 2006/0229076 | A1* | 10/2006 | Monk | H04W 36/18 455/442 |
| 2011/0105059 | A1* | 5/2011 | Gaal | H04W 52/42 455/127.1 |
| 2013/0044611 | A1 | 2/2013 | Jalali et al. | |
| 2013/0182790 | A1 | 7/2013 | Jalali et al. | |
| 2015/0038140 | A1* | 2/2015 | Kilpatrick, II | H04W 68/02 455/436 |
| 2016/0135103 | A1* | 5/2016 | Lee | H04W 72/20 455/444 |
| 2018/0249390 | A1* | 8/2018 | Agiwal | H04W 36/302 |
| 2021/0352559 | A1* | 11/2021 | Casamayón Antón | H04W 36/322 |
| 2022/0209847 | A1* | 6/2022 | Eskridge, Jr. | H04B 7/18504 |

FOREIGN PATENT DOCUMENTS

| | | |
|---|---|---|
| CN | 103891187 A | 6/2014 |
| CN | 205540284 U | 8/2016 |
| CN | 109831240 A | 5/2019 |
| CN | 110312199 A | 10/2019 |
| CN | 110635830 A | 12/2019 |
| CN | 113055062 A | 6/2021 |
| KR | 20200038100 A | 4/2020 |
| KR | 102165802 B1 | 10/2020 |
| WO | 2013056136 A1 | 4/2013 |
| WO | 2013177698 A1 | 12/2013 |
| WO | 2019030280 A1 | 2/2019 |

* cited by examiner

INTERFERENCE SUPPRESSION METHOD AND APPARATUS FOR AIR-TO-GROUND COMMUNICATIONS

CROSS-REFERENCE TO RELATED APPLICATION

The present application is the U.S. national phase of PCT Application No. PCT/CN2021/107623 filed on Jul. 21, 2021, which claims a priority to the Chinese patent application No. 202010728129.X filed in China on Jul. 24, 2020, a disclosure of which is incorporated herein by reference in its entirety.

TECHNICAL FIELD

The present disclosure relates to the field of communications technology, in particular to an interference suppression method for air-to-ground communications, and an interference suppression apparatus for air-to-ground communications.

BACKGROUND

Air-to-ground (ATG) communications refers to a technology of communications between a ground ATG base station and an ATG terminal (e.g., a customer premise equipment (CPE) type) mounted on a plane. When a plane enters a different airspace, the ATG terminal mounted on the plane will receive signals from and gain access to an ATG communication network with the best signal quality. Different from a terrestrial mobile communications system, an ATG communications network requires ground ATG base stations built along a flight route or specific airspaces, high-altitude coverage is enabled through adjustment of parameter such as antenna direction and output power of the ground ATG base stations, and meanwhile antenna gains of ATG terminals need to be provided, so that information transmission is performed directly between the ground ATG base stations and the ATG terminals.

FIG. 1 illustrates an ATG communications network architecture, wherein:
(1) ATG base stations are deployed on the ground, and achieve coverage of a high-altitude flight route through beamforming;
(2) A plane is a special terminal in that a CPE terminal is mounted on the belly of the plane;
(3) The plane and the ATG base stations communicate with each other by means of the 5$^{th}$ generation (5G) New Radio (NR);
(4) The plane and passengers onboard communicate with each other by means of wireless fidelity (WiFi).

How to suppress interferences caused by the ATG communications network to a terrestrial communications system and other systems remains a problem to be solved.

SUMMARY

An objective of embodiments of the present disclosure is to provide an interference suppression method and apparatus for air-to-ground communications, to suppress interferences caused by the ATG communications network to a terrestrial communications system and other systems.

In a first aspect, an embodiment of the present disclosure provides an interference suppression method for ATG communications, applied to an ATG terminal, including:
determining first information, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station.

Optionally, the determining the first information includes: obtaining the first information according to capability information of the ATG terminal.

Optionally, the determining the first information includes: receiving the first information from the ATG base station.

Optionally, the method further includes: reporting capability information to the ATG base station; wherein the capability information is for the ATG base station to determine the first information.

Optionally, the method further includes: receiving instruction information, the instruction information instructing the ATG terminal to report the capability information.

Optionally, the reporting the capability information to the ATG base station includes:
obtaining a flight parameter of an aircraft where the ATG terminal is located;
reporting, according to the flight parameter, the capability information to the ATG base station.

Optionally, the capability information includes one or more of the following:
a terminal type of the ATG terminal;
a power level of the ATG terminal;
a quantity of transmit antennas supported by the ATG terminal;
a quantity of receive antennas supported by the ATG terminal;
movement information of the ATG terminal;
a restricted-power-output area of the ATG terminal;
whether the ATG terminal supports a beam correspondence capability.

Optionally, the first information includes: an allowable transmit power value, an allowable transmit power range, or an allowable transmit power level.

In a second aspect, an embodiment of the present disclosure provides an interference suppression method for ATG communications, performed by an ATG base station, including:
determining first information, wherein the first information is used for one or more of the following: adjusting a maximum transmit power level of an ATG terminal; adjusting an output power value of the ATG terminal; adjusting an antenna gain of the ATG terminal; adjusting an antenna direction of the ATG terminal; determining a type of a terminal that is allowed to access the ATG base station;
sending the first information to the ATG terminal.

Optionally, the determining the first information for the ATG terminal includes:
receiving capability information reported by the ATG terminal;
obtaining, according to the capability information, the first information for the ATG terminal.

Optionally, the receiving the capability information reported by the ATG terminal includes: receiving the capability information reported by the ATG terminal according to a flight parameter of an aircraft where the ATG terminal is located.

Optionally, the method further includes: sending instruction information to the ATG terminal, the instruction information instructing the ATG terminal to report the capability information.

Optionally, the capability information includes one or more of the following:
- a terminal type of the ATG terminal;
- a power level of the ATG terminal;
- a quantity of transmit antennas supported by the ATG terminal;
- a quantity of receive antennas supported by the ATG terminal;
- movement information of the ATG terminal;
- a restricted-power-output area of the ATG terminal;
- whether the ATG terminal supports a beam correspondence capability.

Optionally, the determining the first information for the ATG terminal includes: determining, according to a restricted-power-output area of the ATG terminal that is stored locally, the first information for the ATG terminal.

Optionally, the first information includes: an allowable transmit power value, an allowable transmit power range, or an allowable transmit power level.

In a third aspect, an embodiment of the present disclosure further provides an interference suppression apparatus for ATG communications, applied to an ATG terminal, including:
- a determination module, configured to determine first information, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station.

In a fourth aspect, an embodiment of the present disclosure further provides an ATG terminal, including a processor, a memory and a program stored in the memory and configured to be executed by the processor, wherein the processor is configured to execute the program, to implement the steps of the interference suppression method for ATG communications as described in the first aspect.

In a fifth aspect, an embodiment of the present disclosure further provides an interference suppression apparatus for ATG communications, applied to an ATG base station, including:
- a determination module, configured to determine first information for an ATG terminal, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access the ATG base station;
- a sending module, configured to send the first information to the ATG terminal.

In a sixth aspect, an embodiment of the present disclosure further provides an ATG base station, including a processor, a memory and a program stored in the memory and configured to be executed by the processor, wherein the processor is configured to execute the program, to implement the steps of the interference suppression method for ATG communications as described in the second aspect.

In a seventh aspect, an embodiment of the present disclosure further provides a readable storage medium storing thereon a computer program, wherein the computer program is configured to be executed by a processor, to implement steps of the interference suppression method for ATG communications as described in the first aspect or the second aspect.

In the embodiments of the present disclosure, when an ATG terminal passes a restricted-power-output area, e.g., an area with densely arranged base stations, a low-altitude crawling (e.g., below a certain altitude) area, an area where a protected communications system is located, or a restricted area (e.g., a border, a region), the magnitude of the antenna gain of the ATG terminal may be adjusted or the output power of the ATG terminal may be reduced, to avoid interferences caused by the ATG communications network to a terrestrial communications system and other systems.

BRIEF DESCRIPTION OF THE DRAWINGS

Having read detailed description of optional implementations of the present disclosure set forth below, a person of ordinary skill in the art would easily recognize various additional advantages and benefits. The accompanying drawings are merely for the purpose of illustrating optional implementations of the present disclosure, and are not intended to be construed as a limitation on the present disclosure. The same reference character is used to designate identical components throughout the drawings. In the drawings.

DETAILED DESCRIPTION

Figure 1:
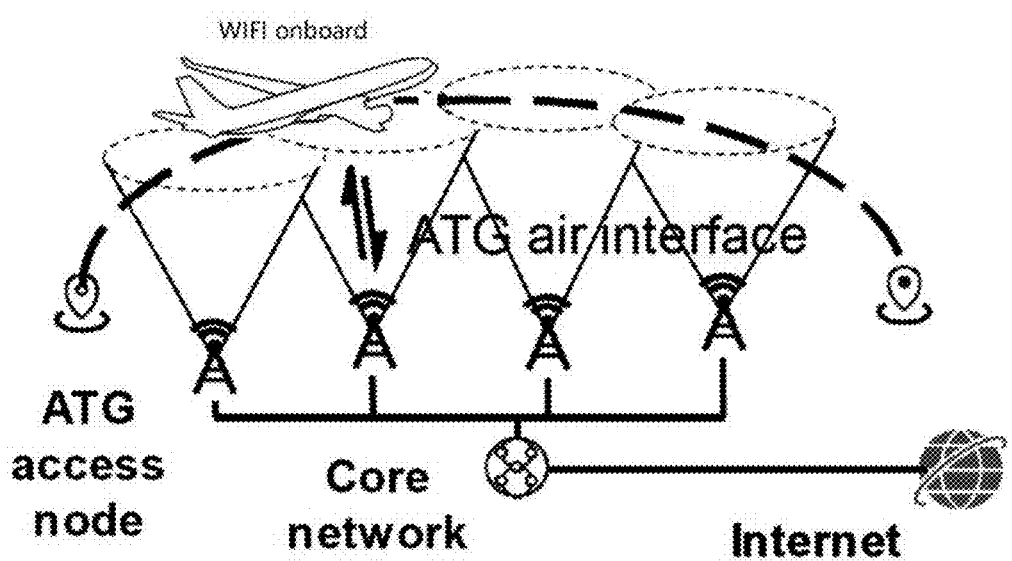
FIG. 1 is a schematic diagram showing an architecture of an ATG communications network.
Figure 2:
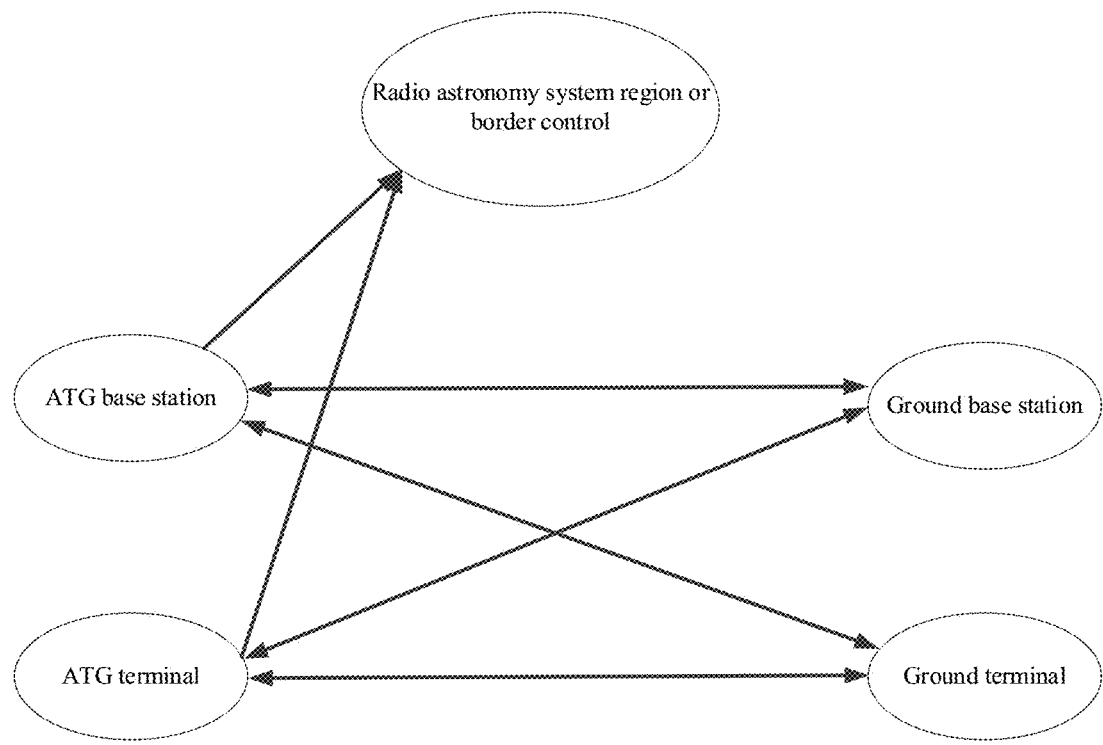
FIG. 2 is a schematic diagram showing interferences between an ATG communications system and a terrestrial communications system and other systems.

Referring to FIG. 2, the ATG communications technology is susceptible to following interference scenarios.

(1) Interferences between an ATG system and other systems or restricted area (e.g., a border, a region):

interferences caused by the ATG base station to a radio astronomy or restricted area (e.g., a border, a region);

interferences caused by the ATG terminal to a radio astronomy or restricted area (e.g., a border, a region).

As for the interferences between the ATG system and other systems or restricted area (e.g., a border, a region), service protection of other systems such as a radio astronomy system or radar which have services in the same or adjacent frequency as the ATG system is involved, and the ATG base station and the ATG terminal are further subject to radiation limitations of regulatory areas, for example, if an ATG network is deployed on the border or in some areas, regulatory requirements of other country or area need to be satisfied.

(2) Interferences between an ATG system and a terrestrial communications system:

interferences between an ATG base station and a ground base station;

interferences between an ATG base station and a ground terminal;

interferences between an ATG terminal and a ground base station;

interferences between an ATG terminal and a ground terminal.

A scenario with relatively severe interferences between the ATG system and the terrestrial communications system involves the interferences between the ground base station and the ATG terminal. A ground base station including a rural base station under macro coverage or an earth station tends to cause interferences to the ATG terminal, thereby reducing sensitivity. Meanwhile, uplink transmission of the ATG terminal causes interferences to ground base stations and ground terminals.

In the following, technical solutions in embodiments of the present disclosure will be described in a clear and complete manner with reference to the drawings related to the embodiments. Obviously, the described embodiments are merely a part of, rather than all of, the embodiments of the present disclosure. Based on the embodiments of the present disclosure, a person skilled in the art may, without any creative effort, obtain other embodiments, which also fall within the scope of the present disclosure.

Terms "include", "comprise" and any variant thereof in the description and claims of the present disclosure are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. In addition, the term "and/or" as used in the description and claims refers to at least one of objects connected by the term. For example, A and/or B may represent three possibilities: only A exists, only B exists, and both A and B exist.

In embodiments of the present disclosure, the word "exemplary" or "for example" or the like is used for meaning examples, example illustration or illustration. Any embodiment or design solution described as "exemplary" or "for example" in the embodiments of the present application should not be construed as being more preferred or advantageous than other embodiments or design solutions. To be specific, the word "exemplary" or "for example" or the like is intended to present related concepts in a specific manner.

The terms "system" and "network" are often interchangeable herein. A CDMA system can implement radio technologies such as CDMA2000 or universal terrestrial radio access (UTRA). UTRA includes wideband code division multiple access (WCDMA) and other CDMA variants. A TDMA system can implement radio technologies such as global system for mobile communication (GSM). An OFDMA system can implement radio technologies such as ultra mobile broadband (UMB), evolved UTRA (E-UTRA), IEEE 802.11 (Wi-Fi), IEEE 802.16 (WiMAX), IEEE 802.20, or Flash-OFDM. Both UTRA and E-UTRA are a part of universal mobile telecommunications system (UMTS). LTE and more advanced LTE (e.g., LTE-A) are new UMTS versions using E-UTRA. UTRA, E-UTRA, UMTS, LTE, LTE-A and GSM are described in the literatures of an organization named "3rd Generation Partnership Project (3GPP)". CDMA2000 and UMB are described in the literatures of an organization named "3rd Generation Partnership Project 2 (3GPP2)". Techniques described herein can be used in the aforementioned systems and radio technologies, and can be used in other systems and radio technologies as well.

Embodiments of the present disclosure provide an interference suppression method applicable to the scenario with relatively severe interferences, i.e., (uplink) transmission of an ATG terminal causes interferences to (uplink) signal reception of a ground base station/(downlink) signal reception of a ground terminal.

When a plane equipped with an ATG terminal (e.g., CPE type) is in flight, signals transmitted by the ATG terminal cause interferences to signal reception of ground base stations or ground terminals. For an application scenario in which the systems share the same frequency but are not synchronized, the interferences caused by the ATG terminal to the ground base stations or the ground terminals are non-negligible. Embodiments of the present disclosure implement interference suppression through following approaches.

1) ATG CPE Beamforming and Application of Beam Correspondence Capability

Both the ATG terminal and the ground base station utilize beamforming to enhance directional transmitting and receiving gain. Through beamforming, beams are directed to ATG base stations, in this way, interferences of the ATG terminal to the ground base stations or ground terminals are suppressed, meanwhile interferences of a ground base station to the ATG terminal in the ATG communications system are reduced.

In order to further reduce the interferences of the uplink transmission of the ATG terminal to the ground base stations or receivers of other communications systems, the ATG CPE may utilize the beam correspondence capability in addition to the beamforming. The beam correspondence capability enables the ATG terminal to select one piece of most suitable uplink transmit information based on measurement of downlink. For example, some ATG terminals may have the beam correspondence capability based on beam sweeping, while some ATG terminals may have the beam correspondence capability which is not based on beam sweeping.

The beam selection capability of the ATG terminal enables the ATG terminal to select a suitable uplink (UL) transmit beam based on measurement of downlink (DL). The capability may narrow the range of beam sweeping and accurately determine downlink transmit power of the ATG terminal. For example, if the ATG terminal has the beam selection capability, the technical improvement of the radio frequency (RF) performance of the ATG terminal may improve the equivalent isotropically radiated power (EIRP) of the ATG terminal, which can be optimized by X dB as compared with the ATG terminal without the beam positioning capability; or, a concept of tolerance is defined to measure the RF performance difference between the ATG terminal with the beam correspondence capability and the ATG terminal without the beam correspondence capability.

Thanks to a highly precise EIRP, the beam directionality of the ATG terminal may be determined more accurately, thereby improving the coverage of the ATG terminal, and obviating interferences caused by the ATG terminal to the ground base station or terminal. Embodiments of the present disclosure provide a solution of introducing the relevant beam capability in the ATG terminal and application scenario.

2) Power Control of ATG Terminal

In an ATG communications system, ground ATG base stations and an ATG terminal (e.g., CPE type) communicate with each other, and user equipment (UE) of passengers onboard the plane are connected to the ATG terminal via WiFi, thus the ATG terminal needs to report a terminal type, and the network side issues an access grant indication according to the terminal type, to grant the ATG terminal the access to the ATG base station, and prevent ground terminals (e.g., NR UE) and terminals (e.g., NR UE) of passengers onboard the plane from accessing the ATG base station.

In some implementations, the ATG terminal may report relevant information according to actual flight parameters of the aircraft where the ATG terminal is located. For example, the ATG terminal may report to the ATG base station one of or a combination of the following: ATG terminal type, power level type, altitude, longitude and latitude, geographical position, speed and regional regulation information. The ATG base station may send signaling, via broadcast information, according to the received information, e.g., one of or a combination of ATG terminal type, power level type, altitude, longitude and latitude, geographical position, speed and regional regulation information, to indicate allowable transmit power value, allowable transmit power range or allowable transmit power level of the ATG terminal. Through signaling interaction between the ATG terminal and the ATG base station, the ATG terminal may be controlled to adjust its antenna gain or reduce its output power when passing an area with densely arranged ground communications base stations, a low-altitude crawling (e.g., below a certain altitude) area, other area where a protected communications system is located, or a restricted area (e.g., a border, a region), so as to meet regional requirements.

In other implementations, according to the stored information about the area with densely arranged base stations, the low-altitude crawling (e.g., below a certain altitude) area, other area where a protected communications system is located, or the restricted area (e.g., a border, a region), the ATG base station may send to the ATG terminal instruction to adjust antenna gain magnitude or reduce output power, so as to meet regional requirements.

In still other implementations, the ATG terminal may also store information about the area with densely arranged base stations, the low-altitude crawling (e.g., below a certain altitude) area, other area where a protected communications system is located, the restricted area (e.g., a border, a region) or the like. When the aircraft flies over these areas with special regulations, the ATG base station may adjust the antenna gain magnitude or reduce the output power for the ATG terminal according to the relevant information reported by the ATG terminal, so as to meet regional requirements.

Figure 3:
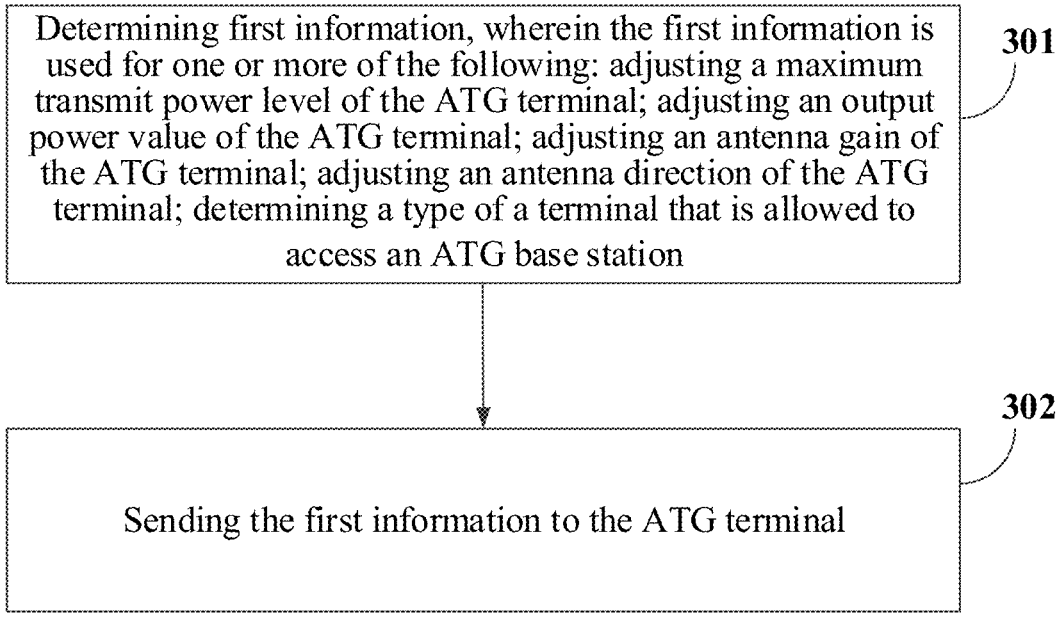
FIG. 3 is a flow diagram of an interference suppression method for ATG communications according to an embodiment of the present disclosure.

Referring to FIG. 3, an embodiment of the present disclosure provides an interference suppression method for ATG communications. The method is performed by an ATG base station, and includes a step 301 and a step 302.

Step 301: determining first information, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station; for example, an ATG terminal is allowed to access the ATG base station. It is understood that the type of the terminal is not specifically limited in the embodiments of the present disclosure.

Optionally, the first information includes: an allowable transmit power value, an allowable transmit power range, or an allowable transmit power level.

Step 302: sending the first information to the ATG terminal.

Optionally, the ATG base station may send the first information to the ATG terminal via dedicated signaling or a system message.

In the embodiment of the present disclosure, when an ATG terminal passes a restricted-power-output area, e.g., an area with densely arranged base stations, a low-altitude crawling (e.g., below a certain altitude) area, an area where a protected communications system is located, or a restricted area (e.g., a border, a region), the magnitude of the antenna gain of the ATG terminal may be adjusted or the output power of the ATG terminal may be reduced, to avoid interferences caused by the ATG communications network to a terrestrial communications system and other systems.

Figure 4:
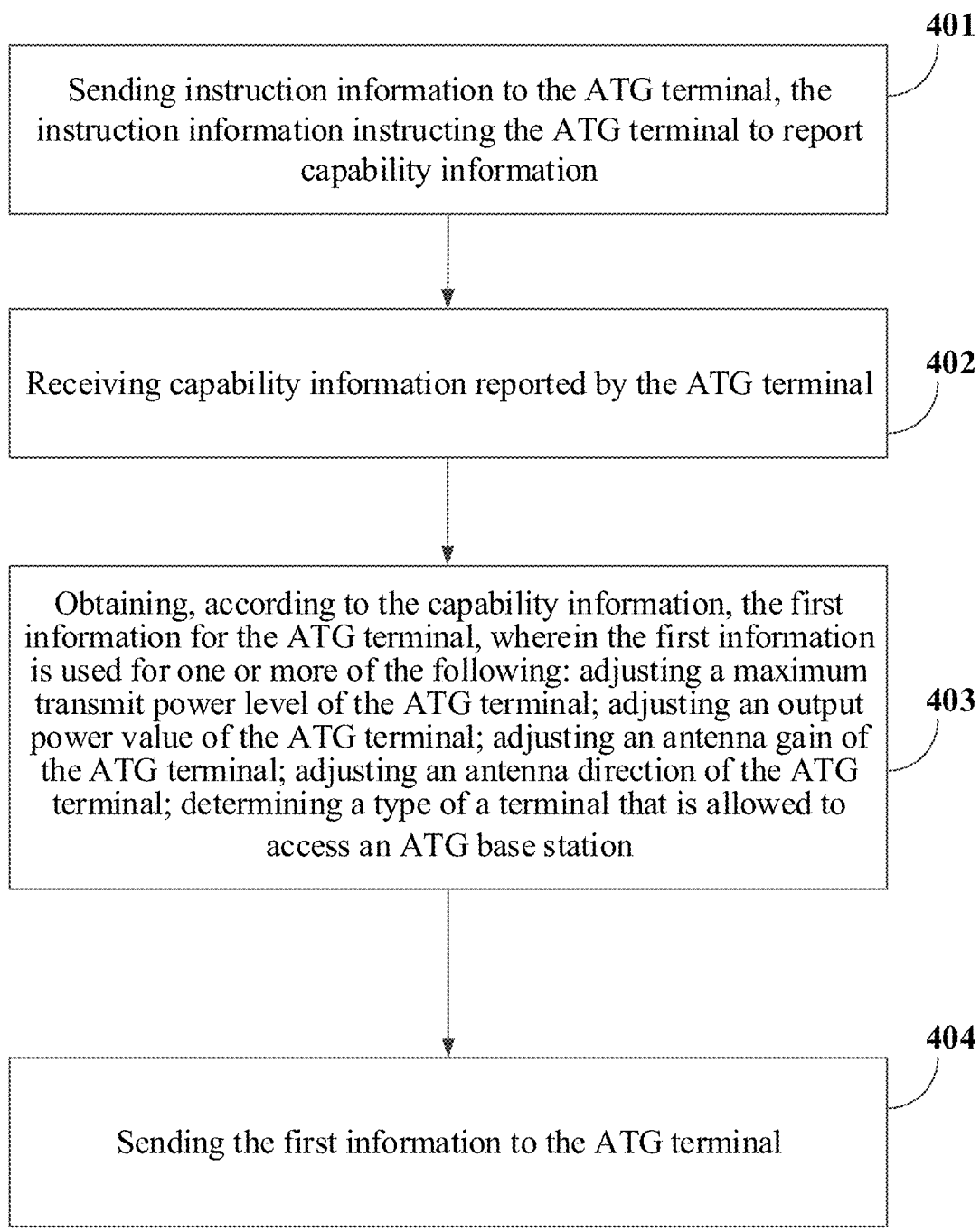
FIG. 4 is a flow diagram of another interference suppression method for ATG communications according to an embodiment of the present disclosure.

Referring to FIG. 4, an embodiment of the present disclosure provides an interference suppression method for ATG communications. The method is performed by an ATG base station, and includes steps 401 to 404.

Step 401: sending instruction information to the ATG terminal, the instruction information instructing the ATG terminal to report capability information.

It is understood that the step 401 is optional.

Step 402: receiving capability information reported by the ATG terminal.

Optionally, receiving the capability information reported by the ATG terminal according to a flight parameter of an aircraft where the ATG terminal is located.

For example, the flight parameter (or flight condition) of the aircraft includes: altitude, longitude and latitude, geographical position, speed or the like.

In the embodiment of the present disclosure, the capability information may include one or more of the following:
  (1) a terminal type of the ATG terminal;
  (2) a power level of the ATG terminal;
  (3) a quantity of transmit antennas supported by the ATG terminal;
  (4) a quantity of receive antennas supported by the ATG terminal;
  (5) movement information of the ATG terminal, e.g., altitude, speed, longitude and latitude, etc.;
  (6) a restricted-power-output area of the ATG terminal, which includes one or more of the following: an area with densely arranged base stations, a low-altitude crawling (e.g., below a certain altitude) area, other area where a protected communications system is located, and a restricted area (e.g., a border, a region);
  (7) whether the ATG terminal supports a beam correspondence capability.

The beam correspondence capability, when being applied by the ATG terminal, enables the ATG terminal to select one suitable UL transmit beam based on measurement of DL. The beam correspondence capability may narrow the range of beam sweeping and accurately determine downlink transmit power of the ATG terminal. For example, if the ATG terminal has the beam selection capability, the technical improvement of the radio frequency (RF) performance of the ATG terminal may improve the EIRP of the ATG terminal, which can be optimized by X dB compared with the ATG terminal without the beam correspondence capability; or, a concept of tolerance is defined to measure the RF performance difference between the ATG terminal with the beam correspondence capability and the ATG terminal without the beam correspondence capability.

Step 403: obtaining, according to the capability information, the first information for the ATG terminal, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station.

Optionally, the first information includes: an allowable transmit power value, an allowable transmit power range, or an allowable transmit power level.

Step 404: sending the first information to the ATG terminal.

Optionally, the ATG base station sends the first information to the ATG terminal via dedicated signaling or a system message.

In the embodiment of the present disclosure, the ATG base station obtains the first information for the ATG terminal based on the capability information reported by the ATG terminal, which facilitates proper scheduling of the ATG terminal by the ATG network. Through interaction between the ATG base station and the ATG terminal, the ATG terminal may be controlled to adjust its antenna gain or reduce its output power when passing a restricted-power-output area such as an area with densely arranged base stations, a low-altitude crawling (e.g., below a certain altitude) area, other area where a protected communications system is located, or a restricted area (e.g., a border, a region), to avoid interferences caused by the ATG communications network to a terrestrial communications system and other systems.

Figure 5:
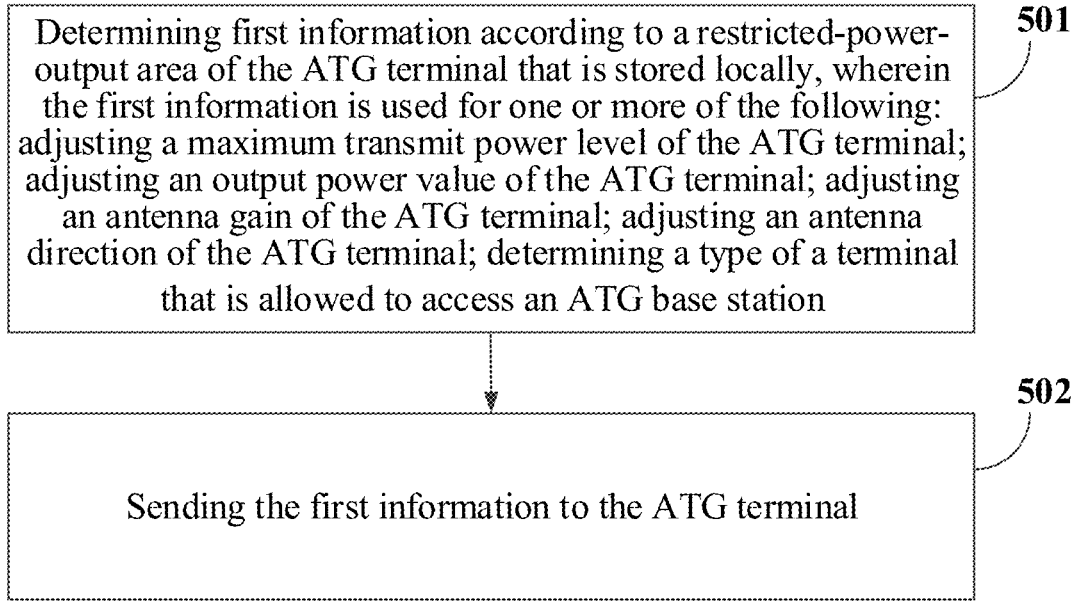
FIG. 5 is a flow diagram of still another interference suppression method for ATG communications according to an embodiment of the present disclosure.

Referring to FIG. 5, an embodiment of the present disclosure provides an interference suppression method for ATG communications. The method is performed by an ATG base station, and includes steps 501 to 502.

Step 501: determining first information according to a restricted-power-output area of the ATG terminal that is stored locally, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station.

The restricted-power-output area includes one or more of the following: an area with densely arranged base stations, a low-altitude crawling (e.g., below a certain altitude) area, other area where a protected communications system is located, and a restricted area (e.g., a border, a region).

Optionally, the first information includes: an allowable transmit power value, an allowable transmit power range, or an allowable transmit power level.

Step 502: sending the first information to the ATG terminal.

Optionally, the ATG base station sends the first information to the ATG terminal via dedicated signaling or a system message.

In the embodiment of the present disclosure, the ATG base station obtains the first information for the ATG terminal based on the restricted-power-output area of the ATG terminal that is stored locally. Through interaction between the ATG base station and the ATG terminal, the ATG terminal may be controlled to adjust its antenna gain or reduce its output power when passing a restricted-power-output area such as an area with densely arranged base stations, a low-altitude crawling (e.g., below a certain altitude) area, other area where a protected communications system is located, or a restricted area (e.g., a border, a region), to avoid interferences caused by the ATG communications network to a terrestrial communications system and other systems.

Figure 6:
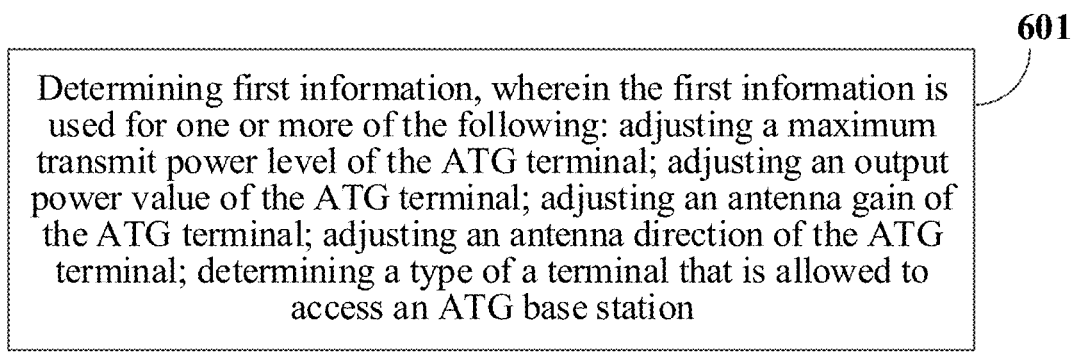
FIG. 6 is a flow diagram of yet another interference suppression method for ATG communications according to an embodiment of the present disclosure.

Referring to FIG. 6, an embodiment of the present disclosure provides an interference suppression method for ATG communications. The method may be performed by an ATG terminal, and includes a step 601.

Step 601: determining first information, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station.

For example, the first information is received from an ATG base station. Optionally, the ATG terminal receives the first information via dedicated signaling or a system message.

In the embodiment of the present disclosure, through interaction between the ATG base station and the ATG terminal, the ATG terminal may be controlled to adjust its antenna gain or reduce its output power when passing a restricted-power-output area such as an area with densely arranged base stations, a low-altitude crawling (e.g., below a certain altitude) area, other area where a protected communications system is located, and a restricted area (e.g., a border, a region), to avoid interferences caused by the ATG communications network to a terrestrial communications system and other systems.

Figure 7:
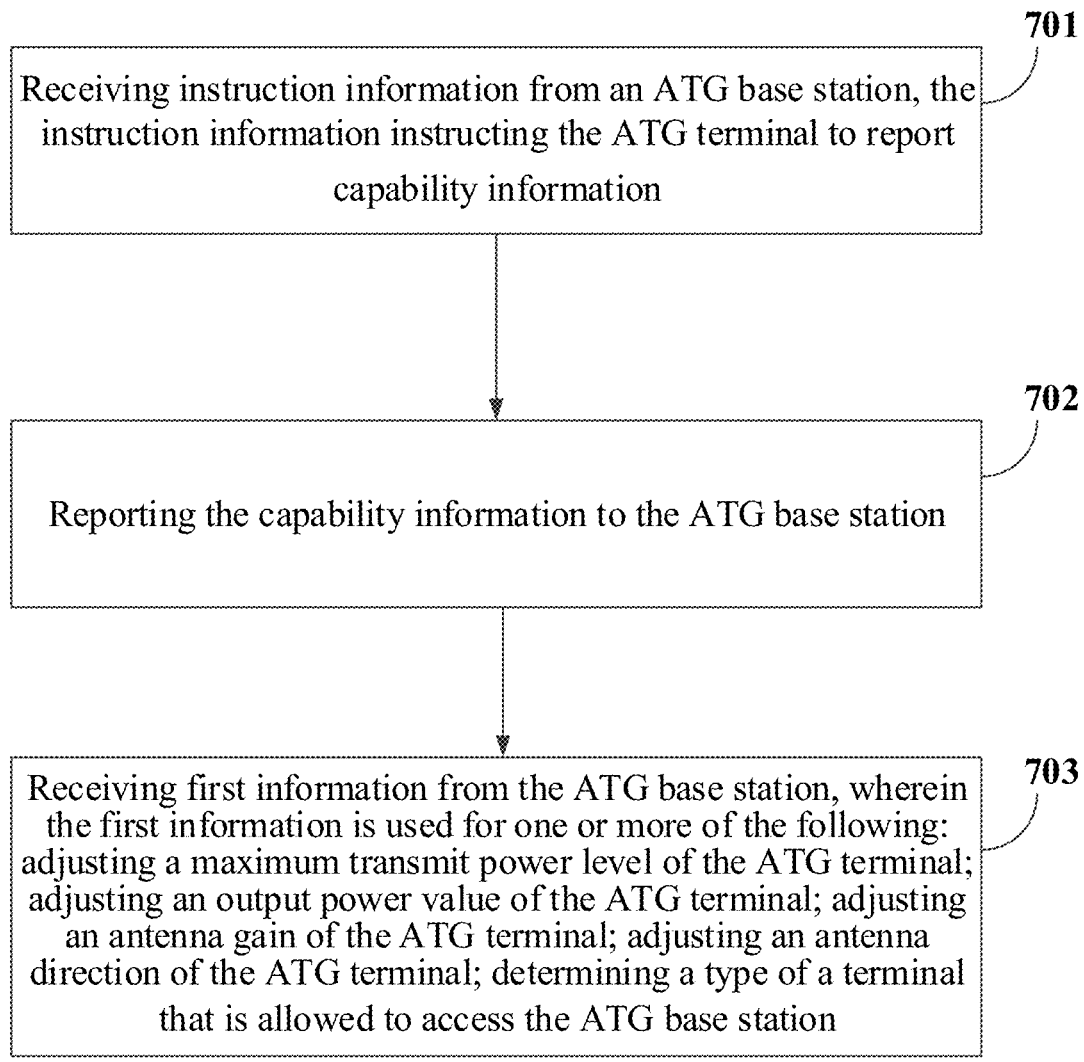
FIG. 7 is a flow diagram of yet another interference suppression method for ATG communications according to an embodiment of the present disclosure.

Referring to FIG. 7, an embodiment of the present disclosure provides an interference suppression method for ATG communications. The method may be performed by an ATG terminal, and includes steps 701 to 703.

Step 701: receiving instruction information from an ATG base station, the instruction information instructing the ATG terminal to report capability information.

It is understood that the step 701 is optional.

Step 702: reporting the capability information to the ATG base station.

For example, reporting, according to a flight parameter of an aircraft where the ATG terminal is located, the capability information to the ATG base station.

For example, the flight parameter of the aircraft includes: altitude, longitude and latitude, geographical position, speed or the like.

Step 703: receiving first information from the ATG base station, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access the ATG base station.

The ATG base station may determine the first information according to the capability information; or the ATG base station may determine the first information according to the capability information and the restricted-power-output area of the ATG terminal that is stored locally on the ATG base station.

Optionally, the ATG terminal receives the first information via dedicated signaling or a system message.

In the embodiment of the present disclosure, through interaction between the ATG base station and the ATG terminal, the ATG terminal may be controlled to adjust its antenna gain or reduce its output power when passing a restricted-power-output area such as an area with densely arranged base stations, a low-altitude crawling (e.g., below a certain altitude) area, other area where a protected communications system is located, and a restricted area (e.g., a border, a region), to avoid interferences caused by the ATG communications network to a terrestrial communications system and other systems.

Figures 8, 9:
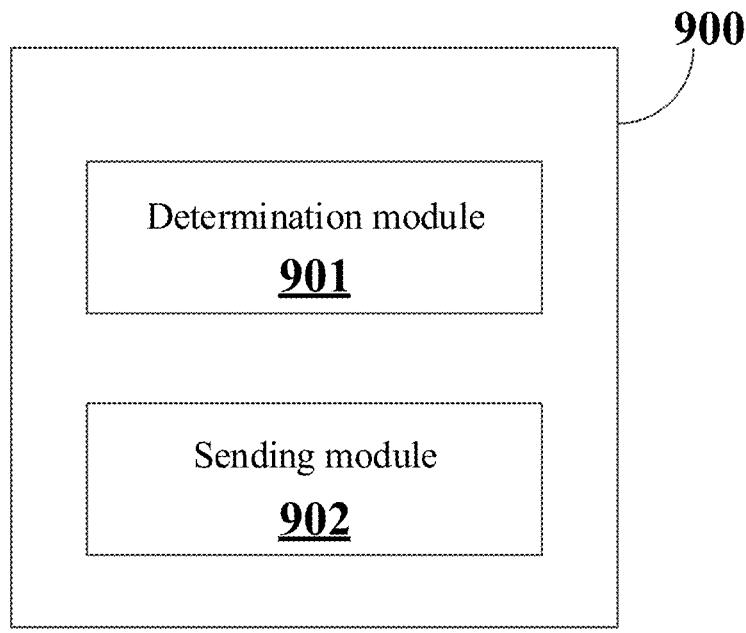
FIG. 8 is a flow diagram of yet another interference suppression method for ATG communications according to an embodiment of the present disclosure.
FIG. 9 is a schematic diagram of an interference suppression apparatus for ATG communications according to an embodiment of the present disclosure.

Referring to FIG. 8, an embodiment of the present disclosure provides an interference suppression method for ATG communications. The method may be performed by an ATG terminal, and includes a step 801.

Step 801: receiving first information from the ATG base station, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access the ATG base station.

The ATG base station may determine the first information according to the restricted-power-output area of the ATG terminal that is stored locally.

Optionally, the ATG terminal receives the first information via dedicated signaling or a system message.

In the embodiment of the present disclosure, through interaction between the ATG base station and the ATG terminal, the ATG terminal may be controlled to adjust its antenna gain or reduce its output power when passing a restricted-power-output area such as an area with densely arranged base stations, a low-altitude crawling (e.g., below a certain altitude) area, other area where a protected communications system is located, and a restricted area (e.g., a border, a region), to avoid interferences caused by the ATG communications network to a terrestrial communications system and other systems.

Referring to FIG. 9, an embodiment of the present disclosure provides an interference suppression apparatus for ATG communications, which is applied to an ATG base station. The apparatus 900 includes:
  a determination module 901, configured to determine first information, wherein the first information is used for one or more of the following: adjusting a maximum transmit power level of an ATG terminal; adjusting an output power value of the ATG terminal; adjusting an antenna gain of the ATG terminal; adjusting an antenna direction of the ATG terminal; determining a type of a terminal that is allowed to access the ATG base station;
  a sending module 902, configured to send the first information to the ATG terminal.

In an embodiment of the present disclosure, the determination module 901 includes:
  a receiving unit, configured to receive capability information reported by the ATG terminal;
  a processing unit, configured to obtain, according to the capability information, the first information for the ATG terminal.

In an embodiment of the present disclosure, the apparatus 900 further includes: a sending module, configured to send instruction information to the ATG terminal, the instruction information instructing the ATG terminal to report the capability information.

In an embodiment of the present disclosure, the capability information includes one or more of the following:
  a terminal type of the ATG terminal;
  a power level of the ATG terminal;
  a quantity of transmit antennas supported by the ATG terminal;
  a quantity of receive antennas supported by the ATG terminal;
  movement information of the ATG terminal;
  a restricted-power-output area of the ATG terminal;
  whether the ATG terminal supports a beam correspondence capability.

In an embodiment of the present disclosure, the determination module 901 is further configured to determine, according to a restricted-power-output area of the ATG terminal that is stored locally, the first information for the ATG terminal.

In an embodiment of the present disclosure, the first information includes: an allowable transmit power value, an allowable transmit power range, or an allowable transmit power level.

The interference suppression apparatus for ATG communications provided by the embodiment of the present disclosure may implement the method embodiments shown in FIG. 3 to FIG. 5, and has similar implementation principles and technical effects, a detailed description thereof is omitted in the embodiment.

Figure 10:
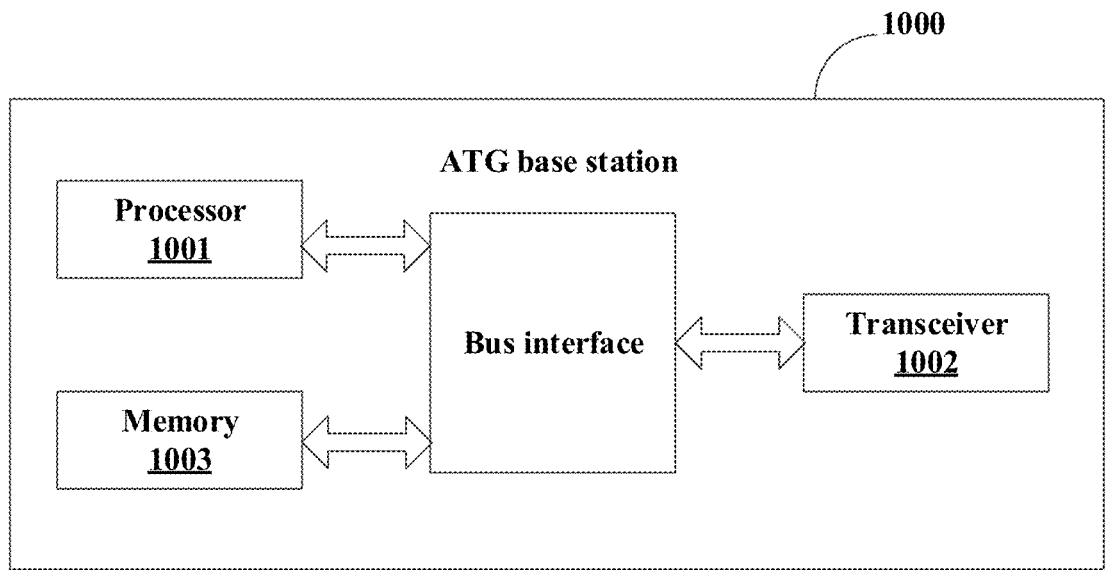
FIG. 10 is a schematic diagram of an ATG base station according to an embodiment of the present disclosure.

FIG. 10 is a structural diagram of an ATG base station to which embodiments of the present disclosure are applicable. As shown in FIG. 10, an ATG base station 1000 includes: a processor 1001, a transceiver 1002, a memory 1003 and a bus interface.

In an embodiment of the present disclosure, the ATG base station 1000 further includes a program stored in the memory 1003 and configured to be executed by the processor 1001, wherein the processor 1001 is configured to execute the program, to implement functions of various modules of the embodiments shown in FIG. 3 to FIG. 5.

In FIG. 10, a bus architecture may include any number of interconnected buses and bridges, and connects various circuits including one or more processors represented by the processor 1001 and memory represented by the memory 1003. The bus architecture may also connect various other circuits such as peripherals, voltage regulators and power management circuits, which are well known in the art. Therefore, a detailed description thereof is omitted herein. The bus interface provides an interface. The transceiver 1002 may be multiple elements, i.e., including a transmitter and a receiver, to allow for communication with various other apparatuses on the transmission medium.

The processor 1001 is responsible for supervising the bus architecture and normal operation and the memory 1003 may store the data being used by the processor 1001 during operation.

The ATG base station provided by the embodiment of the present disclosure may implement the method embodiments shown in FIG. 3 to FIG. 5, and has similar implementation principles and technical effects, a detailed description thereof is omitted in the embodiment.

Figure 11:
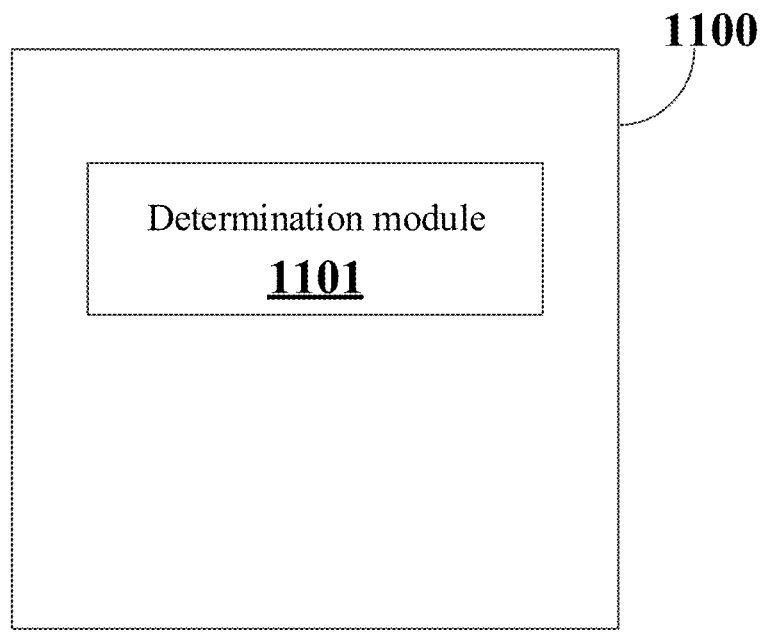
FIG. 11 is a schematic diagram of another interference suppression apparatus for ATG communications according to an embodiment of the present disclosure.

Referring to FIG. 11, an embodiment of the present disclosure provides an interference suppression apparatus for ATG communications, which is applied to an ATG terminal. The apparatus 1100 includes:

a determination module 1101, configured to determine first information, wherein the first information is used for one or more of the following: adjusting a maximum transmit power level of an ATG terminal; adjusting an output power value of the ATG terminal; adjusting an antenna gain of the ATG terminal; adjusting an antenna direction of the ATG terminal; determining a type of a terminal that is allowed to access the ATG base station.

In an embodiment of the present disclosure, the determination module 1101 is further configured to obtain the first information according to capability information of the ATG terminal.

In an embodiment of the present disclosure, the determination module 1101 is further configured to receive the first information from the ATG base station.

In an embodiment of the present disclosure, the apparatus 1100 further includes: a reporting module, configured to report capability information to the ATG base station; wherein the capability information is for the ATG base station to determine the first information.

In an embodiment of the present disclosure, the reporting module is further configured to report, according to a flight parameter of an aircraft where the ATG terminal is located, the capability information to the ATG base station.

In an embodiment of the present disclosure, the apparatus 1100 further includes: a receiving module, configured to receive instruction information, the instruction information instructing the ATG terminal to report the capability information.

In an embodiment of the present disclosure, the apparatus 1100 further includes: an adjusting module, configured to adjust an antenna gain of the ATG terminal or an output power value of the ATG terminal or a maximum transmit power level of the ATG terminal according to the first information and a restricted-power-output area of the ATG terminal.

The interference suppression apparatus for ATG communications provided by the embodiment of the present disclosure may implement the method embodiments shown in FIG. 6 to FIG. 8, and has similar implementation principles and technical effects, a detailed description thereof is omitted in the embodiment.

Figure 12:
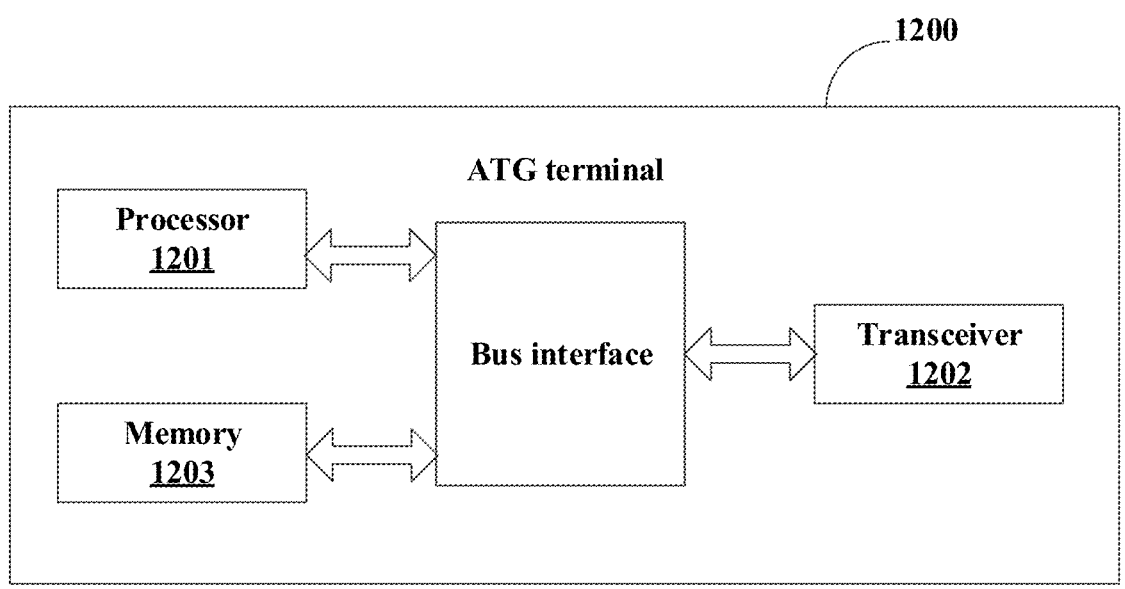
FIG. 12 is a schematic diagram of an ATG terminal according to an embodiment of the present disclosure.

FIG. 12 is a structural diagram of an ATG terminal to which embodiments of the present disclosure are applicable. As shown in FIG. 12, an ATG terminal 1200 includes: a processor 1201, a transceiver 1202, a memory 1203 and a bus interface.

In an embodiment of the present disclosure, the ATG terminal 1200 further includes a program stored in the memory 1203 and configured to be executed by the processor 1201, wherein the processor 1201 is configured to execute the program, to implement functions of various modules of the embodiments shown in FIG. 6 to FIG. 8.

In FIG. 12, a bus architecture may include any number of interconnected buses and bridges, and connects various circuits including one or more processors represented by the processor 1201 and memory represented by the memory 1203. The bus architecture may also connect various other circuits such as peripherals, voltage regulators and power management circuits, which are well known in the art. Therefore, a detailed description thereof is omitted herein. The bus interface provides an interface. The transceiver 1202 may be multiple elements, i.e., including a transmitter and a receiver, to allow for communication with various other apparatuses on the transmission medium.

The processor 1201 is responsible for supervising the bus architecture and normal operation and the memory 1203 may store the data being used by the processor 1201 during operation.

The ATG terminal provided by the embodiment of the present disclosure may implement the method embodiments shown in FIG. 6 to FIG. 8, and has similar implementation principles and technical effects, a detailed description thereof is omitted in the embodiment.

An embodiment of the present disclosure further provides a readable storage medium storing thereon a program or instruction, wherein the program or instruction is configured to be executed by a processor to implement various processes of the method embodiments shown in FIG. 3 to FIG. 8, and may achieve the same technical effects. To avoid redundancy, a detailed description thereof is omitted herein.

The steps of the method or algorithm described in the present disclosure may be implemented in form of hardware, or implemented in form of a software instruction executable by a processor. The software instruction may be composed of corresponding software modules, and the software modules may be stored in a random access memory (RAM), flash memory, read-only memory (ROM), erasable programmable ROM (EPROM), electrically EPROM (EEPROM), register, hard disk, removable hard disk, read-only optical disc or any other form of storage medium well known in the art. An exemplary storage medium is coupled to a processor, so that the processor may read information from the storage medium and write information to storage medium. Certainly, the storage medium may be a part of the processor. The processor and the storage medium may reside in an ASIC. In addition, the ASIC may reside in a core network interface device. Certainly, the processor and the storage medium may also reside in the core network interface device as discrete components.

It may be understood that these embodiments described in this disclosure may be implemented by hardware, software, firmware, middleware, microcode or a combination thereof. For hardware implementation, a module, unit, sub-module or sub-unit may be implemented in one or more application specific integrated circuits (ASICs), a digital signal processor (DSP), a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

Persons skilled in the art would appreciate that, in the foregoing one or more examples, the functions described by the present disclosure may be implemented with hardware, software, firmware or any combination thereof. When being implemented with software, these functions may be stored in a computer readable medium or transmitted as one or more instructions or codes in a computer readable medium. The computer readable medium includes a computer storage medium and a communication medium. The communication medium includes any medium facilitating the transmission of a computer program from one place to another. The storage medium may be any available medium accessible by a general purpose computer or a special purpose computer.

The objective, technical solution and beneficial effects of the present disclosure are described in further details with reference to the foregoing specific implementations. It is understood that the aforementioned are merely specific implementations of the present disclosure, and are not intended to limit the scope of the disclosure. Any modifications, equivalent replacements or improvements made on the basis of the technical solution of the present disclosure should be encompassed in the scope of the present disclosure.

It is appreciated by a person skilled in the art that, embodiments of the present disclosure may be implemented as a method, device or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer readable storage media (including, but not limited to, a magnetic disk storage, CD-ROM, optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing device to produce a machine, such that the instructions, which are executed via the processor of the computer or other programmable data processing device, create means for implementing the functions specified in the flow diagram flow or flows and/or block diagram block or blocks.

These computer program instructions may also be stored in a computer-readable storage that can direct a computer or other programmable data processing device to function in a particular manner, such that the instructions stored in the computer-readable storage produce an article of manufacture including instruction means which implement the function specified in the flow diagram flow or flows and/or block diagram block or blocks.

The computer program instructions may also be loaded onto a computer or other programmable data processing device to cause a series of operational steps to be performed on the computer or other programmable device to produce a computer-implemented process such that the instructions which are executed on the computer or other programmable device provide steps for implementing the functions specified in the flow diagram flow or flows and/or block diagram block or blocks.

Obviously, a person skilled in the art may make several improvements and modifications in the embodiments of the present disclosure without departing from the spirit and scope of the present disclosure. Thus, the present disclosure intends to encompass these improvements and modifications if they fall within the scope of the claims of the present disclosure and equivalents thereof.

What is claimed is:

1. An interference suppression method for air-to-ground (ATG) communications, applied to an ATG terminal, comprising:
   determining first information, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station;
   wherein the determining the first information comprises:
   receiving the first information from the ATG base station;
   reporting capability information to the ATG base station;
   wherein the capability information is for the ATG base station to determine the first information;
   wherein the reporting the capability information to the ATG base station comprises:
   obtaining a flight parameter of an aircraft where the ATG terminal is located; and
   reporting, according to the flight parameter, the capability information to the ATG base station.

2. The method according to claim 1, wherein the determining the first information comprises:
   obtaining the first information according to capability information of the ATG terminal.

3. The method according to claim 2, wherein the capability information comprises one or more of the following:
   a terminal type of the ATG terminal;
   a power level of the ATG terminal;
   a quantity of transmit antennas supported by the ATG terminal;
   a quantity of receive antennas supported by the ATG terminal;
   movement information of the ATG terminal;
   a restricted-power-output area of the ATG terminal;
   whether the ATG terminal supports a beam correspondence capability.

4. The method according to claim 1, further comprising:
   receiving instruction information, the instruction information instructing the ATG terminal to report the capability information.

5. The method according to claim 1, wherein the first information comprises: an allowable transmit power value, an allowable transmit power range, or an allowable transmit power level.

6. A non-transitory readable storage medium storing thereon a computer program, wherein the computer program is configured to be executed by a processor, to implement steps of the interference suppression method for ATG communications according to claim 1.

7. An interference suppression method for ATG communications, applied to an ATG base station, comprising:
   determining first information, wherein the first information is used for one or more of the following: adjusting a maximum transmit power level of an ATG terminal; adjusting an output power value of the ATG terminal; adjusting an antenna gain of the ATG terminal; adjusting an antenna direction of the ATG terminal; determining a type of a terminal that is allowed to access the ATG base station; and
   sending the first information to the ATG terminal;
   wherein the determining the first information for the ATG terminal comprises:
   receiving capability information reported by the ATG terminal; and
   obtaining, according to the capability information, the first information for the ATG terminal;
   wherein the receiving the capability information reported by the ATG terminal comprises:
   receiving the capability information reported by the ATG terminal according to a flight parameter of an aircraft where the ATG terminal is located.

8. The method according to claim 7, further comprising:
sending instruction information to the ATG terminal, the instruction information instructing the ATG terminal to report the capability information.

9. The method according to claim 7, wherein the capability information comprises one or more of the following:
a terminal type of the ATG terminal;
a power level of the ATG terminal;
a quantity of transmit antennas supported by the ATG terminal;
a quantity of receive antennas supported by the ATG terminal;
movement information of the ATG terminal;
a restricted-power-output area of the ATG terminal;
whether the ATG terminal supports a beam correspondence capability.

10. The method according to claim 7, wherein the determining the first information for the ATG terminal comprises:
determining, according to a restricted-power-output area of the ATG terminal that is stored locally, the first information for the ATG terminal.

11. The method according to claim 7, wherein the first information comprises: an allowable transmit power value, an allowable transmit power range, or an allowable transmit power level.

12. An ATG base station, comprising a processor, a memory and a program stored in the memory and configured to be executed by the processor, wherein the processor is configured to execute the program, to implement steps of the interference suppression method for ATG communications according to claim 7.

13. An ATG terminal, comprising a processor, a memory and a program stored in the memory and configured to be executed by the processor, wherein the program, when being executed by the processor, causes the processor to determine first information, wherein the first information is used for one or more of the following: adjusting a maximum transmit power level of the ATG terminal; adjusting an output power value of the ATG terminal; adjusting an antenna gain of the ATG terminal; adjusting an antenna direction of the ATG terminal; determining a type of a terminal that is allowed to access an ATG base station;
wherein in the determining the first information, the processor is further configured to:
receive the first information from the ATG base station;
report capability information to the ATG base station;
wherein the capability information is for the ATG base station to determine the first information;
wherein in the reporting the capability information to the ATG base station, the processor is further configured to:
obtain a flight parameter of an aircraft where the ATG terminal is located; and
report, according to the flight parameter, the capability information to the ATG base station.

14. The ATG terminal according to claim 13, wherein in determining the first information, the processor is further configured to:
obtain the first information according to capability information of the ATG terminal.

* * * * *